United States Patent [19]

Sallmén et al.

[11] 4,356,110

[45] Oct. 26, 1982

[54] SECONDARY STABILIZER

[75] Inventors: Bengt A. L. Sallmén; Carl-Axel E. Sjögreen, both of Perstorp; Mans O. Månsson, Helsingborg; Keith F. R. Ogemark, Perstorp, all of Sweden

[73] Assignee: Perstorp AB, Perstorp, Sweden

[21] Appl. No.: 955,585

[22] Filed: Oct. 30, 1978

[30] Foreign Application Priority Data

Nov. 29, 1977 [SE] Sweden .............................. 77134682

[51] Int. Cl.³ ............................................. C09K 15/06
[52] U.S. Cl. .................................. 252/407; 252/404; 524/343; 524/387
[58] Field of Search .............................. 252/407, 404; 260/23 XA, 45.95 R, 45.95 L, 45.95 F

[56] References Cited

U.S. PATENT DOCUMENTS 3,285,868  11/1966  Hecker et al. .......................... 260/23

FOREIGN PATENT DOCUMENTS 1400919  7/1975  United Kingdom .......... 260/23 XA

*Primary Examiner*—Joseph L. Schofer
*Assistant Examiner*—J. L. Barr
*Attorney, Agent, or Firm*—Stevens, Davis, Miller & Mosher

[57] ABSTRACT

Secondary stabilizer for vinyl chloride polymers consisting of a solid mixture obtained by melting together pentaerythritol and at least one of the compounds selected from the group consisting of dipentaerythritol, tripentaerythritol, trimethylol propane, neopentyl glycol, trimethylol ethane, anhydroennea heptitol, sorbitol, mannitol, bisphenol A and other organic hydroxy compounds containing at least two hydroxy groups. The stabilizer is characterized in that the mixture has the form of a dispersion of very fine-grained particles in a suitable liquid grinding agent, which dispersion has been obtained by wet grinding said mixture in said grinding agent.

5 Claims, No Drawings

SECONDARY STABILIZER

The present invention relates to a secondary stabilizer for vinyl chloride polymers and a process for the production thereof. The stabilizer is preferably intended for polyvinyl chloride. However, it is advantageous to use it also for other similar polymers such as afterchlorinated polyvinyl chlorides, copolymers of vinyl chloride and vinyl acetate, copolymers of vinyl chloride and styrene and others.

Certain vinyl polymers, especially polyvinyl chloride (PVC), demand an addition of stabilizers to prevent a decomposition of the polymer at elevated temperatures, for instance at the working temperatures. Organic stannic compounds are probably the best individual stabilizers for this purpose. However, they are rather expensive and they often give unsuitable smells.

Also polyvalent metal salts of organic acids can be used as stabilizers for PVC.

However, they must be combined with secondary stabilizers to give the same effect as the organic stannic compounds. Such secondary stabilizers are for example organic phosphites, organic sulphur compounds, epoxy compounds and polyhydric alcohols such as pentaerythritol and trimethylol propane (TMP). Usually several of these secondary stabilizers are used at the same time together with the polyvalent metal salts of organic acids. Such combinations of metal salt and secondary stabilizers are mentioned for instance in the U.S. Pat. Nos. 2,564,646, 2,711,401 and 3,003,999.

It is often suitable that the pre-blended stabilizer mixture is available in the shape of a fine powder. If polyhydric alcohols shall be used as secondary stabilizers in such a mixture, they must have such qualities that they can be incorporated into the mixture in a satisfactory way. Thus, the alcohols must be solid products which can be produced in the shape of a fine powder. It is also desirable that the polyhydric alcohols have a large number of hydroxy groups per molecule, since the stabilizing effect is related to the number of hydroxy groups.

The polyhydric alcohols being available commercially in large quantities are mainly pentaerythritol, TMP and sorbitol and other alcohols based on sugar. Sorbitol and alcohols based on sugar have their greatest use in such connections where the demand for upoisonousness is great, for example at food packages. However, these alcohols suffer from the disadvantage to have a limited thermal stability. Therefore a PVC composition containing such an alcohol as a stabilizer may be discolored when it is subjected to high temperatures at the working or on later occasions.

Pentaerythritol has a high thermal stability and a high hydroxy equivalance. However, it has a considerable disadvantage owing to its high melting point. Thus, pentaerythritol will not melt at the temperatures used at working of the polyvinyl chloride. Thereby, pentaerythritol will not be dispersed in the plastic material as effective as such products which exist as a melt at the working temperature of the plastic. This often results in a decrease of the transparency of the plastic product produced. Said decrease of the transparency is caused by undissolved pentaerythritol particles.

According to the British Pat. No. 1,400,919 it is known before to bring about a secondary stabilizer for vinyl chloride polymers. Then trimethylol propane and pentaerythritol and optionally one or more of the compounds dipentaerythritol, tripentaerythritol, neopentyl glycol, trimethylol ethane, anhydroennea heptitol and sorbitol are melted together. A solid mixture of the compounds used is thereby obtained. The mixture is chilled and finally it is disintegrated to a powder in a usual way. The secondary stabilizer thus obtained has got many good qualities as compared to previously known stabilizers where different polyhydric alcohols were added separately.

Consequently, a much improved compatibility with PVC as compared to pure pentaerythritol is obtained. Moreover, the stabilizer has a considerably higher melting point than pure TMP. Thereby, it can easily be powdered. The stabilizer also gives the plastic product produced a good transparency.

The above difficulties connected to the use of pentaerythritol as a stabilizer for vinyl chloride polymers have mainly been solved by the process according to the British Pat. No. 1,400,919.

According to the present invention a secondary stabilizer for vinyl chloride polymers has been brought about, which stabilizer in certain aspects has got even better properties than the stabilizer according to the British Pat. No. 1,400,919. The new stabilizer consists of a solid mixture obtained by melting together pentaerythritol and at least one of the compounds selected from the group consisting of dipentaerythritol, tripentaerythritol, trimethylol propane, neopentyl glycol, trimethylol ethane, anhydroennea heptitol, sorbitol, mannitol, bisphenol A and other organic hydroxy compounds containing at least two hydroxy groups. The stabilizer is characterized in that the mixture has the form of a dispersion of very fine-grained particles in a suitable liquid grinding agent, which dispersion has been obtained by wet grinding said mixture in said grinding agent.

According to the present invention one has found out that the particle size of a pulverulent secondary stabilizer of the present kind has got a decisive importance for the result concerning the hazyness of the plastic product produced. This is not shown in the British patent 1,400,919. Thus, according to that patent a conventional dry grinding process is used for the production of the pulverulent stabilizer. At such a process it is impossible with reasonable work to bring about very fine-grained particles, i.e. particles having a medium size less than 20 $\mu$m, preferably less than 10 $\mu$m.

It has also turned out that the crystal size of the secondary stabilizer used has a significance for the grinding result not noticed before. It can for example be mentioned that big crystals are obtained at a crystallization of pure pentaerythritol. It is extremely energy demanding to disintegrate these big crystals. Consequently, to decrease the energy costs and at the same time make it possible to obtain a satisfactory grinding result it is advantageous that the secondary stabilizer produced is obtained already at the beginning in as small crsytals as possible.

At the production of the secondary stabilizer according to the invention, pentaerythritol is melted together with at least one of the specified compounds as mentioned above. Then the crystallization of the pentaerythritol is disturbed. This results in smaller crystal size of the stabilizer produced. In contrast to the stabilizer of the British Pat. No. 1,400,919, it is not necessary that the present stabilizer should contain TMP.

In order to decrease the particle size of the stabilizer to a desired level, a wet grinding process is used according to the invention. Then the stabilizer is ground in a suitable liquid grinding agent after an optional disintegration which can consist of a conventional dry grinding.

Several different grinding agents can be used according to the present invention. Preferably, such products are used which are still added to the plastic material, for example complementary stabilizers, primary or secondary plasticizers, lubricants, antioxidants or solvents. Then only one of these products or a mixture of many products can be used.

Dioctylphthalate and epoxidized soya bean oil are two suitable grinding agents. Sometimes it can also be advantageous to increase the viscosity of the grinding agent by an addition of a thickening agent.

At the wet grinding a dispersion of very fine-grained stabilizer particles in the grinding agent is obtained. In certain cases such a product is more advantageous for the user than a powder.

Suitably, the stabilizer according to the invention can consist of a solid mixture obtained by melting together pentaerythritol, dipentaerythritol, tripentaerythritol and trimethylol propane.

A preferable stabilizer composition consists of a solid mixture obtained by melting together 45–99.5 percent by weight of pentaerythritol, 50–0.5 percent by weight of dipentaerythritol and 5–0 percent by weight of tripentaerythritol.

Another preferable stabilizer composition consists of a solid mixture obtained by melting together 60–97 percent by weight of pentaerythritol, 10–0 percent by weight of dipentaerythritol and 30–3 percent by weight of trimethylol propane.

According to the invention several other stabilizer compositions where pentaerythritol is melted together with one or more of the compounds specified above are useful. Then it is important that the added compound or compounds decrease the crystal size of the pentaerythritol, which has been explained above.

The stabilizer according to the invention gives the plastic product produced a very good transparency and thermal stability. At the same time a decreased tendency to migration of pentaerythritol out of the plastic material is obtained.

The stabilizer according to the invention is intended to be used as a secondary stabilizer in combination with the above mentioned polyvalent metal salts or with other stabilizers. The proportion of the stabilizer used is quite conventional, i.e. it is usually between 0.1 and 20 percent by weight of the amount of resin.

Before the working the secondary stabilizer and a primary stabilizer in the form of polyvalent metal salts are added to the polyvinyl chloride resin. This addition can be carried out in a rapid mixer, for example in the form of a two-roll mill and at a temperature where the mass is fluid (about 120°–230° C.). Also other components such as plasticizers, lubricants and mould release agents can be incorporated into the mixture.

The present invention will be elucidated more in detail in connection with the embodiment examples below. Then examples 1 and 3 show the production of a secondary stabilizer according to the invention. Example 2 is a comparative example showing the production of a secondary stabilizer according to the British Pat. No. 1,400,919. Also example 4 is a comparative example. It shows the production of a stabilizer in the same way as according to the invention. In this case, however, the stabilizer is only containing pentaerythritol. In example 5 it is described how different secondary stabilizers influence on the discoloration of a PVC product at elevated temperature. The influence on the light transparency of a PVC product at the use of different secondary stabilizers is described in example 6. In example 7 the tendency to migration out of the PVC product at the use of different secondary stabilizers is compared.

EXAMPLE 1

In a reactor of 200 liters provided with a heating jacket and an anchor stirrer, 80 kg of pentaerythritol was charged and then melted in a nitrogen gas atmosphere at 250° C. while it was stirred. 20 kg of dipentaerythritol was charged to the melt. The melt was then transferred to a cooled rotating roll provided with a scraper. The flakes obtained were ground in a mill to a fine powder. In a laboratory dissolving apparatus 665 g of this powder and 935 g of epoxidized soya bean oil (Edenol D 81 from Henkel & Cie GmbH) were charged.

Then the mixture was transferred to a colloid mill where it was wet ground in the liquid soya bean oil. At stirring another 1060 g of epoxidized soya bean oil of the same kind as before was added to the ground mixture. The dispersion obtained, containing 25 percent by weight of a very fine-grained pulverulent stabilizer according to the invention is called product C below.

EXAMPLE 2

In a reactor of 200 liters provided with a heating jacket and an anchor stirrer, 5 kg of trimethylol propane, 85.5 kg of pentaerythritol and 9.5 kg of dipentaerythritol were charged. The mixture was melted at 240° C. in a nitrogen gas atmosphere while it was stirred. A transparent melt was obtained. Then the melt was transferred to a cooled rotating roll provided with a scraper. The flakes obtained were ground in a mill to a fine powder. The product obtained is called product B below.

EXAMPLE 3

The process according to example 2 was repeated. 665 g of the pulverulent product B obtained and 935 g of epoxidized soya bean oil of the kind mentioned above were charged in a laboratory dissolving apparatus. Then the mixture was transferred to a colloid mill where it was wet ground in the liquid soya bean oil. At stirring another 1060 g of epoxidized soya bean oil of the same kind as before was added to the ground mixture. The dispersion obtained, containing 25 percent by weight of a very fine-grained pulverulent stabilizer according to the invention is called product D below.

EXAMPLE 4

665 g of pulverulent pentaerythritol (from Perstorp AB) was treated in the same way as the product D in example 3. As a final product a dispersion containing 25 percent by weight of very fine-grained pentaerythritol was obtained. This product is called product E below.

EXAMPLE 5

In a double jacketed mixing vessel provided with a propeller stirrer at the bottom and a double winged propeller above said first propeller a number of experiments were made. Then 2000 g of PVC (Solvic 258-RD$_{223}$ from Solvic S.A.), 200 g of impact strength additive (Kane ACE B-28 from Kaneka N.V.), 40 g of working aid (K 120 N from Rohm & Haas AG), 12 g of glycerol monosteate (Loxiol G 12 from Henkel & Cie GmbH), 8 g of montane wax (Vax OP from Farbwerke Hoechst), 2 g of antioxidant (butylated hydroxytoluen), 60 g of epoxidized soya bean oil (Edenol D81 from Henkel & Cie GmbH), 19 g of calcium/zinc stearate (340 D from Swedstab AB), 2.2 g zincethyl hexoate (from Bärlocher AG) and 6 of of organic phosphite (Weston 618 from Borg-Warner N.V.) were charged.

At the first experiment no secondary stabilizer was used. At the second experiment another 9 g of epoxidized soya bean oil and 3 g of pulverulent pentaerythritol (from Perstorp AB) were added as a secondary stabilizer. At experiment No. 3, 12 g of product C was added. 12 g of product D was added at experiment No. 4. At experiment No. 5, 12 g of product E was added. Finally, at experiment No. 6, 3 g of product B and 9 g of epoxidized soya been oil were added.

The heating of the vessel was started by introducing warm water into the jacket. At the same time the stirring was started.

When the material in the mixer had got a temperature of 110° C. the cooling water was fed into the jacket. When the temperature had decreased to 40° C. the stirrng was interrupted and the vessel was emptied.

150 g of the mixture obtained above was charged between the rolls of a two-roll mill of a conventional laboratory model with a roll diameter of 160 mm. The milling was carried out at 22 rounds per minute. The rolls were heated by steam. The milling temperature was regulated to 170°±3° C. A gelatinizing was obtained after 15-25 seconds. Then the object was milled for 5 minutes after the gelatinizing. The thickness of the foil was adjusted to about 1 mm.

The thermal stability of the different foil samples was measured by introducing samples having a size of 2×2 cm into an oven having a temperature of 180° C. The samples were well packed in an aluminium foil. The oven had a very good air circulation. Thereby a constant temperature of 180° C. could be kept. The discoloration of the samples was used as a measure of the thermal stability. The time passed until a blacking of the samples was obtained is described below as the thermal stability expressed in minutes. In table 1 below the thermal stability obtained at the use of the above mentioned products is shown.

TABLE 1

| Secondary stabilizer | Thermal stability in minutes |
| --- | --- |
| None | 38 |
| Pentaerythritol (experiment No. 2) | 44 |
| Product B | 44 |
| Product C | 50 |
| Product D | 48 |
| Product E | 46 |

The table shows that the products C and D give the best stabilizing effect.

EXAMPLE 6

Samples of the foils produced according to example 5 were compared in respect of the light transparency. In order to eliminate the influence of irregularities in the surface the samples were first pressed between glossy plates in a laminate press. The press time was 10 minutes, the moulding pressure 100 kg/cm² and the moulding temperature 140° C. The pressed foil samples were taken out for measuring of the transparency according to ASTM D 1003-61. According to said method the haze of the sample is used as a measure of the transparency. At the method mentioned above the percentage part of the entering light, which changes its direction by spreading at the passage of the light through the sample, is measured. The result of the measuring is given in table 2 below.

TABLE 2

| Secondary stabilizer | Thickness of the sample, mm | Haze, percent | Corrected haze,[1] percent |
| --- | --- | --- | --- |
| None | 1.55 | 15.2 | 9.8 |
| Pentaerythritol (experiment No 2) | 1.62 | 19.1 | 11.8 |
| Product B | 1.61 | 18.5 | 11.5 |
| Product C | 1.58 | 15.3 | 9.7 |
| Product D | 1.54 | 14.6 | 9.5 |
| Product E | 1.65 | 18.2 | 11.0 |

[1]Calculated as the measured value of the haze in percent divided by the thickness of the sample in mm.

Table 2 shows that the products C and D are not giving any increase of the haze which, however, is the case with pentaerythritol and product B.

EXAMPLE 7

The sublimation tendency of the mixtures obtained according to the experiments 1-3 of example 5 was measured in the following way.

200 g of the mixtures were charged between the rolls of a two-roll mill of a conventional laboratory model with a roll diameter of 160 mm. The milling was carried out at 22 rounds per minute. The rolls were heated by steam. The milling temperature was regulated to 190°±3° C. A gelatinizing was obtained after 15-25 seconds. Then the sample was milled for 20 minutes after the gelatinizing. The thickness of the foil was adusted to about 1 mm. Before the milling was started a cup having a diameter of 190 mm was mounted above the nip between the rolls. Material from the foil which has migrated out of the plastic material is sublimating and then condensing on the cold under-side of the cup. After 20 minutes the under side of the cup was washed with a specified amount of distilled water. In the aqueous solution now obtained the amount of oxygen consuming material was measured by a simple titration. In table 3 below the amount of oxygen consumed by each solution is shown.

TABLE 3

| Secondary stabilizer | Mg oxygen gas consumed per liter solution |
| --- | --- |
| None | 0.75 |
| Pentaerythritol (experiment No 2) | 1.16 |
| Product C | 0.88 |

Table 3 shows that product C gives a considerable reduction of the sublimation.

The invention is not limited to the embodiment examples shown, as these can be modified in different ways within the scope of the invention.

We claim:

1. A secondary stabilizer for vinyl chloride polymers comprising particles of a mixture of pentaerythritol and a second organic compound having at least two hydroxyl groups dispersed in a liquid carrier in which the said mixture has been ground, said particles having been prepared by melting together the pentaerythritol and said second organic compound having at least two hydroxyl groups, solidifying the resulting molten mixture, and grinding the resulting solid white mixed with said liquid carrier to form a dispersion of solid particles in the liquid carrier.

2. The stabilizer of claim 1 wherein the said mixture contains 45-99.5 percent by weight pentaerythritol and the remainder of a second polyhydric alcohol.

3. A process for making a secondary stabilizer for a vinyl chloride polymer which comprises melting together pentaerythritol and a second organic compound having at least two hydroxyl groups, cooling the melt until solidified, mixing the resulting solid with a liquid carrier, and grinding the solid while mixed with the liquid carrier to form a dispersion of mixed pentaerythritol and said second organic compound having at least two hydroxyl groups in the liquid carrier.

4. The secondary stabilizer of claim 1 wherein the said second organic compound having at least two hydroxyl groups is selected from the group consisting of dipentaerythritol, tripentaerythritol, trimethylol propane, neopentyl glycol, trimethylol ethane, sorbitol, mannitol and bisphenol A.

5. In a process for preparing a stabilizer for stabilizing a vinyl chloride polymer wherein pentaerythritol is melted together with a second organic compound having at least two hydroxyl groups and the resulting melt is ground into fine particles, the improvement which comprises grinding said melt in a liquid carrier to form a secondary stabilizer for a vinyl chloride polymer which is suspended in the liquid carrier.

* * * * *

UNITED STATES PATENT AND TRADEMARK OFFICE
CERTIFICATE OF CORRECTION

PATENT NO. : 4,356,110

DATED : October 26, 1982

INVENTOR(S) : SALLMEN, et al.

It is certified that error appears in the above-identified patent and that said Letters Patent is hereby corrected as shown below:

Claim 1, Column 6, last line change "white" to --while--.

Signed and Sealed this

Twelfth Day of February 1985

[SEAL]

Attest:

DONALD J. QUIGG

Attesting Officer     Acting Commissioner of Patents and Trademarks